E. MORTERUD.
PROCESS FOR EVAPORATING LIQUIDS.
APPLICATION FILED OCT. 15, 1918.

1,418,197.

Patented May 30, 1922.
2 SHEETS—SHEET 2.

UNITED STATES PATENT OFFICE.

EINAR MORTERUD, OF TORDEROD, NEAR MOSS, NORWAY.

PROCESS FOR EVAPORATING LIQUIDS.

1,418,197.  Specification of Letters Patent.  Patented May 30, 1922.

Application filed October 15, 1918. Serial No. 258,271.

*To all whom it may concern:*

Be it known that I, EINAR MORTERUD, a subject of the King of Norway, of Torderod, near Moss, Norway, have invented certain new and useful Improvements in a Process for Evaporating Liquids; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the evaporation of liquids or solutions with the object of utilizing the solid substance dissolved in or mixed with the solution, it is known to use the exhaust vapour in a compressed condition as a means for evaporating a new quantity of solvent.

In order to utilize this process the heat transmission must necessarily take place with very small differences of temperature as it requires a comparatively large amount of energy to compress the vapour to such a pressure that any considerable difference of temperature is obtained.

In order to operate with the small difference of temperature the heat transmission through the surface separating the compressed vapour and the solution to be evaporated has to be the best possible. This obviously applies to single-step as well as to multi-step evaporations, the heat economy of the latter type being dependent on the number of steps, and the number of steps again depend on the efficiency of the heat transmission at a determined difference of temperature.

It has been proposed to attain the above mentioned advantage by removing steam bubbles as well as all solid substance from the heating surface, and it has also been proposed to increase the supply of heat to the heating surface by maintaining the highest possible velocity of vapor along the same.

According to the present invention the best possible transmission of heat is obtained by wholly dispensing with the separating surface. For this purpose there is used a heat transmitting medium which absorbs its heat from the compressed vapour or steam and transmits it to the solution to be evaporated.

It is obvious that if the heat transmission can be established in such a manner that the heat emitting medium, i. e., the compressed vapour transmits its heat directly to a medium which in the next interval of time acts itself as a directly transmitting heating medium to the solution which is to be evaporated, the maximum of efficiency will be attained for the transmission of heat.

In this manner all difficulties incident to the solid transmission surface such as precipitation, etc., are avoided.

A medium which may be used for this purpose has to be physically as well as chemically stable with regard to the solution as well as with regard to the vapour and the condensate of the same.

Arrangments for carrying out evaporation of solutions according to the present process are illustrated on the accompanying drawings, where:

Figure 1:
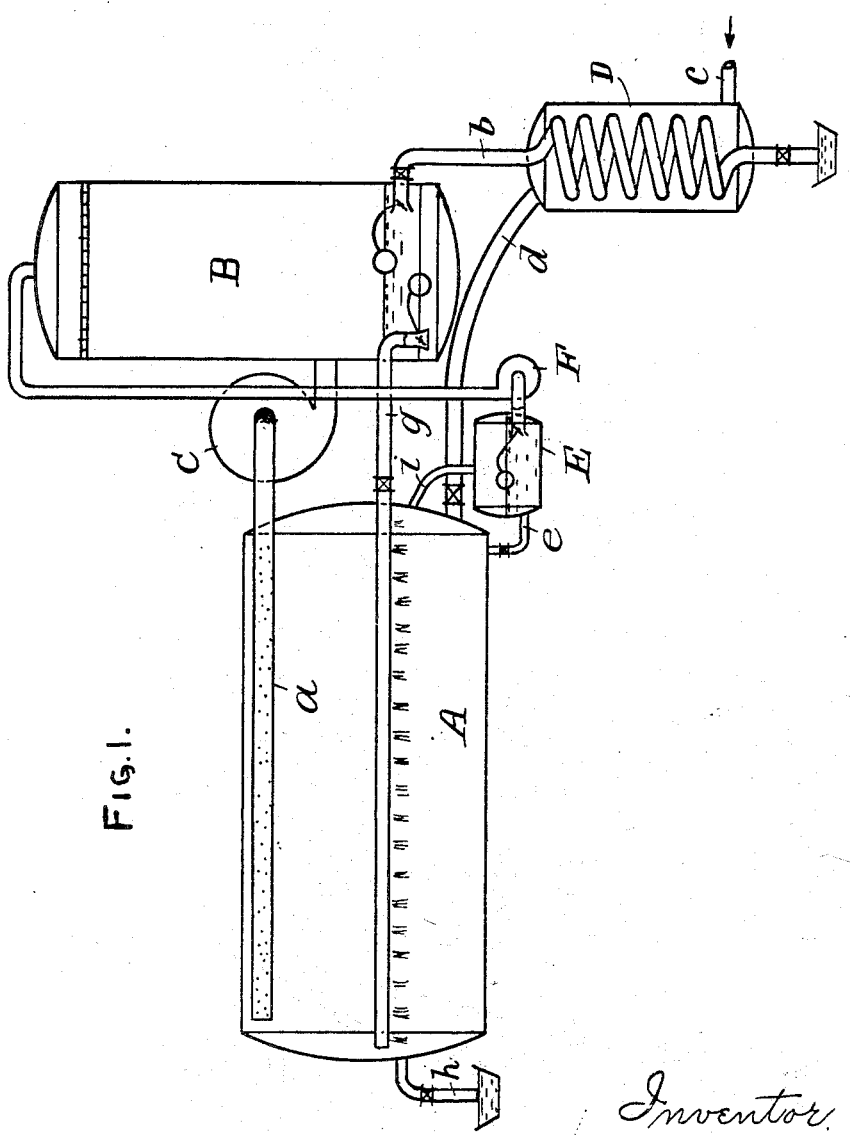
Fig. 1 illustrates an arrangement in which a liquid serves as heat transmitter.

In arrangements where a heat absorbing liquid is used as transmitter—as illustrated in Fig. 1 both liquids are mixed, and the transmission of heat takes place directly.

The larger and the less in number the evaporating vessels are, the larger and stronger the intermediate current of steam or vapor has to be in order to receive from one vessel the heat at disposal in the same and emit the same heat in the heat receiving vessel.

In Fig. 1 the transmission of heat from the compressed steam for example vapors from a solution of a salt to the liquid to be evaporated, for example a salt solution, takes place by means of another liquid, and the arrangement is based on the presumption that the transmission liquid is heavier than the liquid to be evaporated.

A is the evaporating vessel, from which the vapor generated is conducted through tube *a* to compressor C, compressing the steam or vapor and conducting it into the heat transmission vessel B. In this vessel the compressed vapor is condensed on meeting a spray of heat transmitting liquid as mercury, heavy oil or the like, which is pumped by means of pump F through vessel E from vessel A to vessel B.

When the compressed vapor has emitted its latent heat to the heat transmitting liquid in B and has been condensed by means of the same, the two liquids separate at the bottom of vessel B according to their specific weight. The heavier heat transmission liquid is pressed by means of the pressure existing in B through the spray pipe $g$ into vessel A and is here conducted in a finely divided spray into the solution to be evaporated. The heat transmission liquid, mercury or oil, will sink to the bottom of vessel A and is removed from the same through tube $e$ leading to vessel E from which it starts again on its circulation.

Tube $i$ serves to conduct back to vessel A the solution to be evaporated which may have followed the transmission solution into vessel E.

The condensate of compressed vapors formed in vessel B is conducted automatically through tube $b$ into the counter flow pre-heater D. In the latter apparatus the heat from the condensate is transmitted to the new quantity of solution which is fed to the evaporating vessel. Said liquid enters vessel D by means of tube $c$ and is conducted from vessel D through tube $d$ to vessel A. Tube $h$ serves to conduct the concentrated remains of the evaporated liquid (concentrated salt solution) out of vessel A for further treatment.

If the nature of the heat transmission liquid is such that it needs a considerable time to separate from the condensate in B or the evaporating liquid in A, this obviously has to be taken into consideration, and static or dynamic means may be employed for aiding the separation process.

On the drawing are shown float-actuated valves, controlling the outlets for the liquid from vessel B and E. The float mechanism illustrated is purely diagrammatical and is only intended to indicate any well known mechanism for maintaining a constant level in the vessels.

By providing a number of devices of this kind arranged in series where the outlet $h$ from vessel A forms the inlet $c$ to the pre-heater of the next device, the concentration may be carried out in a multi-step process.

Figure 2:
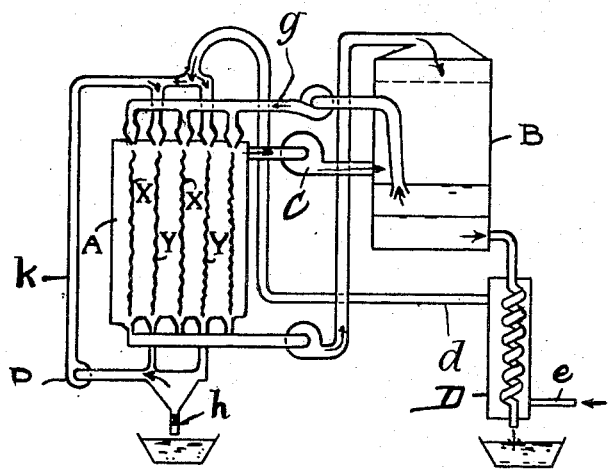
Fig. 2 illustrates a modification of the evaporating vessel in which the heat is transmitted without direct contact, but by means of radiation from adjacent irrigation surfaces.

In Fig. 2 is illustrated a modification of the evaporation vessel in connection with the arrangement illustrated in Fig. 1. In this modified arrangement the heat transmitting liquid, for instance oil, being lighter than water is easily separated from the evaporation liquid. The oil is heated by contact with the vapor in vessel B which vapor is compressed by a compressor C. This heated oil is conducted through pipe $g$ into the evaporating vessel A and flows along surfaces X. Between these surfaces are located evaporating surfaces Y, along which flows brine, said surfaces Y being in a brine circuit which includes a pump P and pipe K, fresh brine being supplied to said circuit through a pipe $c$, preheater D and pipe $d$. The brine flowing along the surfaces Y absorbs heat from the heated oil flowing along the surfaces X and is evaporated.

The condensed brine is drawn off through cock $h$ into a receptacle while the condensate of the vapor formed in vessel B is discharged automatically through the preheater D.

Claims.

1. The process of evaporating liquids, which comprises compressing the vapor from a solution to be evaporated, transmitting by contact the condensation heat of the compressed vapor to an intermediate material that is insoluble in the condensate from the solution being evaporated, and evaporating the solution by the heat absorbed by said material.

2. The process of evaporating liquids, which comprises compressing the vapor from a solution to be evaporated, heating by contact with the compressed vapor a heat transmitting medium that is insoluble in the condensate from the solution being evaporated by the condensation heat of the vapor of said solution, and evaporating the solution by proximation said heat transmitting medium.

3. The process of evaporating liquids, which comprises compressing the vapor of a solution to be evaporated, and directly contacting with said vapor a heat absorbing medium to thereby heat said medium by the condensation heat of said vapor, and evaporating said solution by the heat of said medium.

4. The process of evaporating liquids, which comprises compressing the vapor from a solution, passing said vapor in contact with a heat absorbing liquid having extended surface contact with the compressed vapor and then passing the thus heated absorbing liquid in extended surface in a chamber with the solution to be evaporated.

5. The process of evaporating liquids, which comprises compressing the vapor from a solution, passing said vapor in contact with a heat absorbing liquid to be heated by the condensation heat of said vapor, passing said heated liquid into a closed chamber over distributing surfaces alternating with similar surfaces over which the solution to be evaporated is distributed, said alternating surfaces being sufficiently close to one another that a substantial part of the heat transmission from said liquid to the solution takes place by radiation.

6. The process of evaporating liquids, which comprises evaporating a solution in a closed chamber, compressing the resulting vapor and discharging it into a closed receptacle in contact with a liquid heating medium, discharging said medium in jets in said chamber alternating with jets of said solution and withdrawing solution from said chamber and redischarging it into said receptacle for repeated evaporation.

7. The process of evaporating liquids which comprises evaporating a solution in a closed chamber, compressing and discharging the compressed vapor into a closed receptacle in contact with a heat transmitting liquid, discharging the condensate from said receptacle through a pre-heater, discharging the heat transmitting medium in jets into said chamber, said jets alternating with jets of solution to be evaporated, repeating the passage of the solution through said chamber and introducing fresh solution to the solution jets through said pre-heater.

In testimony that I claim the foregoing as my invention, I have signed my name in presence of two subscribing witnesses.

EINAR MORTERUD.

Witnesses:
M. W. KAHN,
C. VORMAN.